A. TROMBETTI.
AUTOMATIC COUPLING FOR RAILWAY AND TRAMWAY CARS OR WAGONS.
APPLICATION FILED JUNE 29, 1911.
1,056,958.
Patented Mar. 25, 1913.
5 SHEETS—SHEET 1.
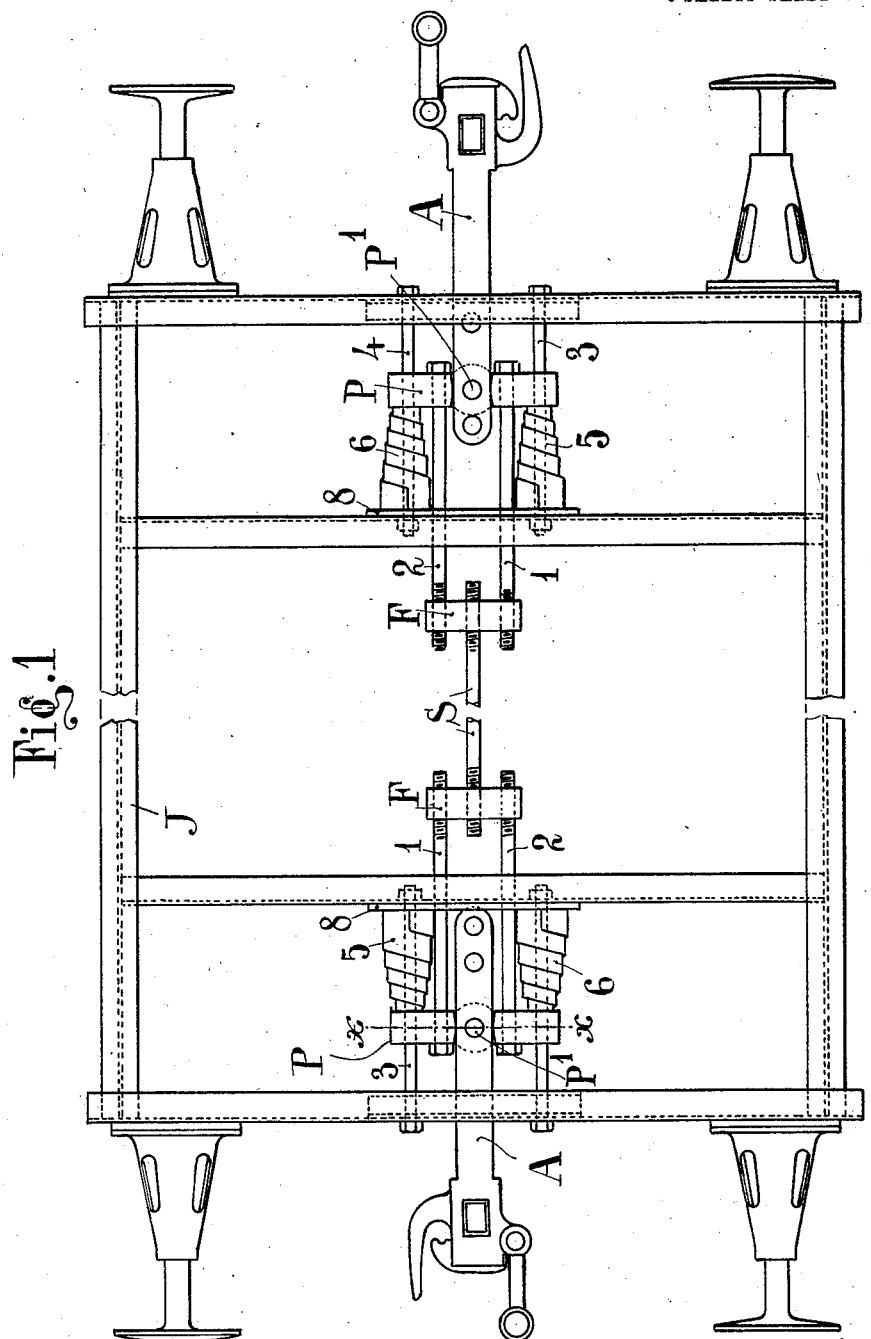
Witnesses:
Inventor
Agostino Trombetti
By B. Singer
Attorney.

A. TROMBETTI.
AUTOMATIC COUPLING FOR RAILWAY AND TRAMWAY CARS OR WAGONS.
APPLICATION FILED JUNE 29, 1911.
1,056,958.
Patented Mar. 25, 1913.
5 SHEETS—SHEET 2.
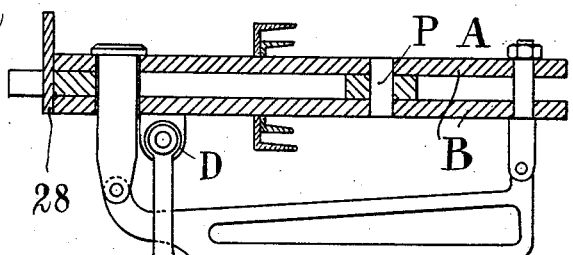
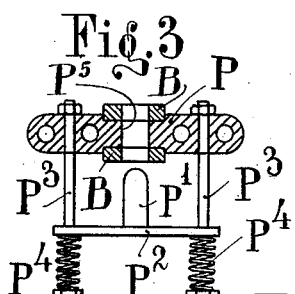
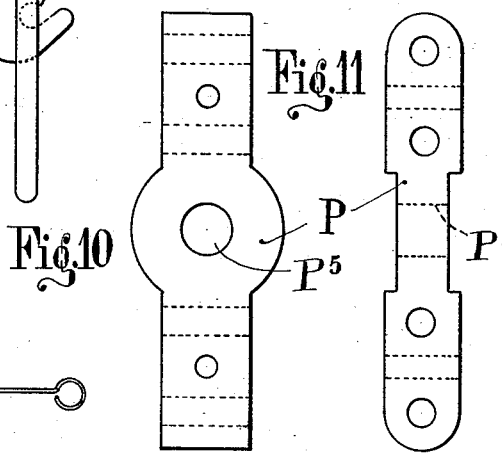
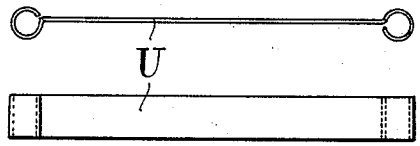
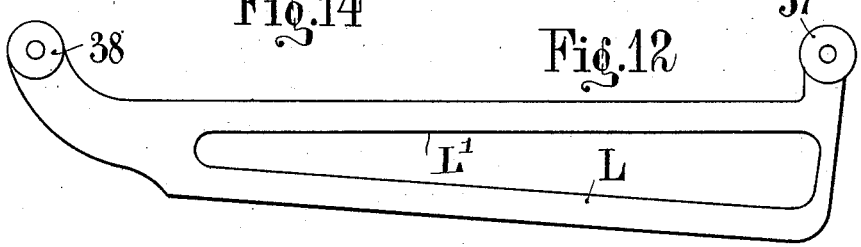
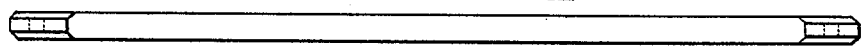
Witnesses:
Inventor
Agostino Trombetti,
By B. Singer
Attorney.

A. TROMBETTI.
AUTOMATIC COUPLING FOR RAILWAY AND TRAMWAY CARS OR WAGONS.
APPLICATION FILED JUNE 29, 1911.
1,056,958.
Patented Mar. 25, 1913.
5 SHEETS—SHEET 3.
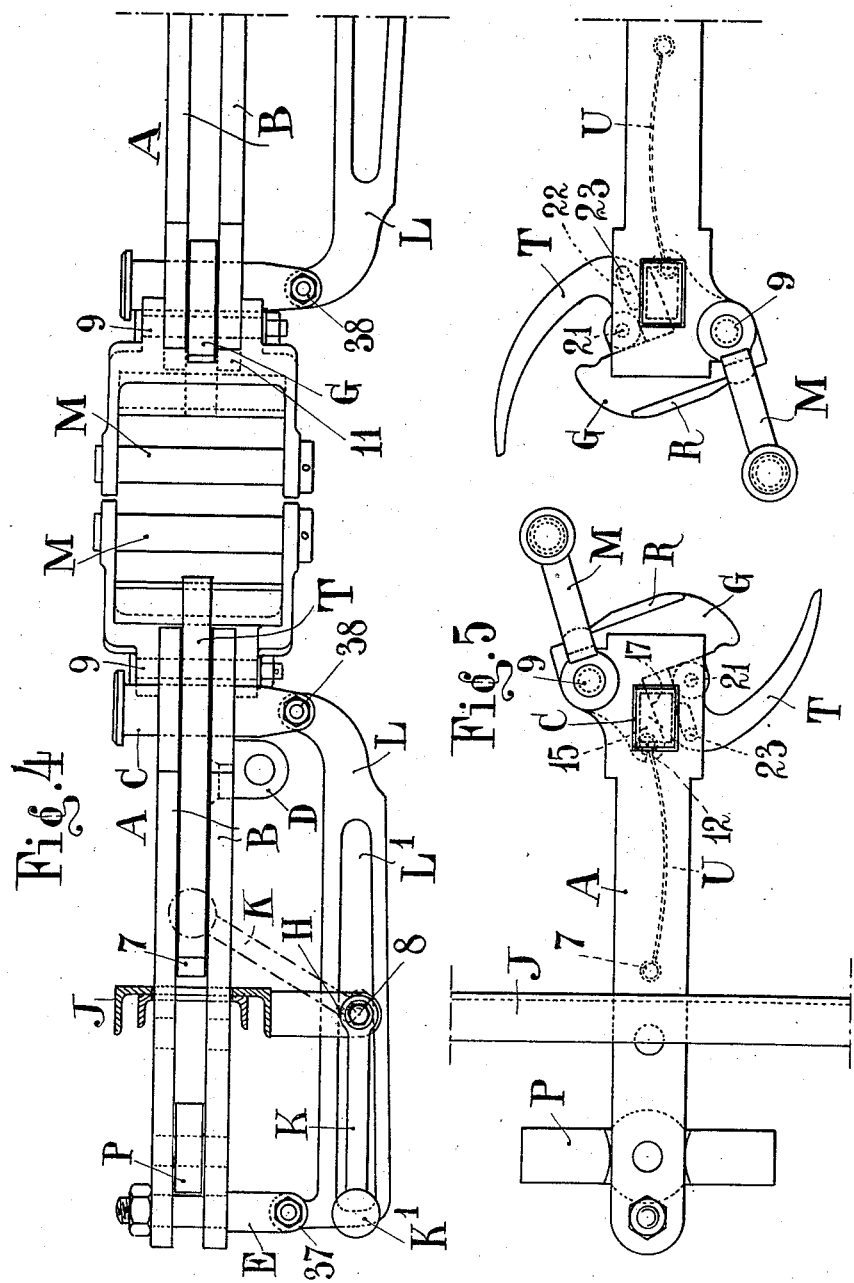

A. TROMBETTI.
AUTOMATIC COUPLING FOR RAILWAY AND TRAMWAY CARS OR WAGONS.
APPLICATION FILED JUNE 29, 1911.
1,056,958.
Patented Mar. 25, 1913.
5 SHEETS—SHEET 4.
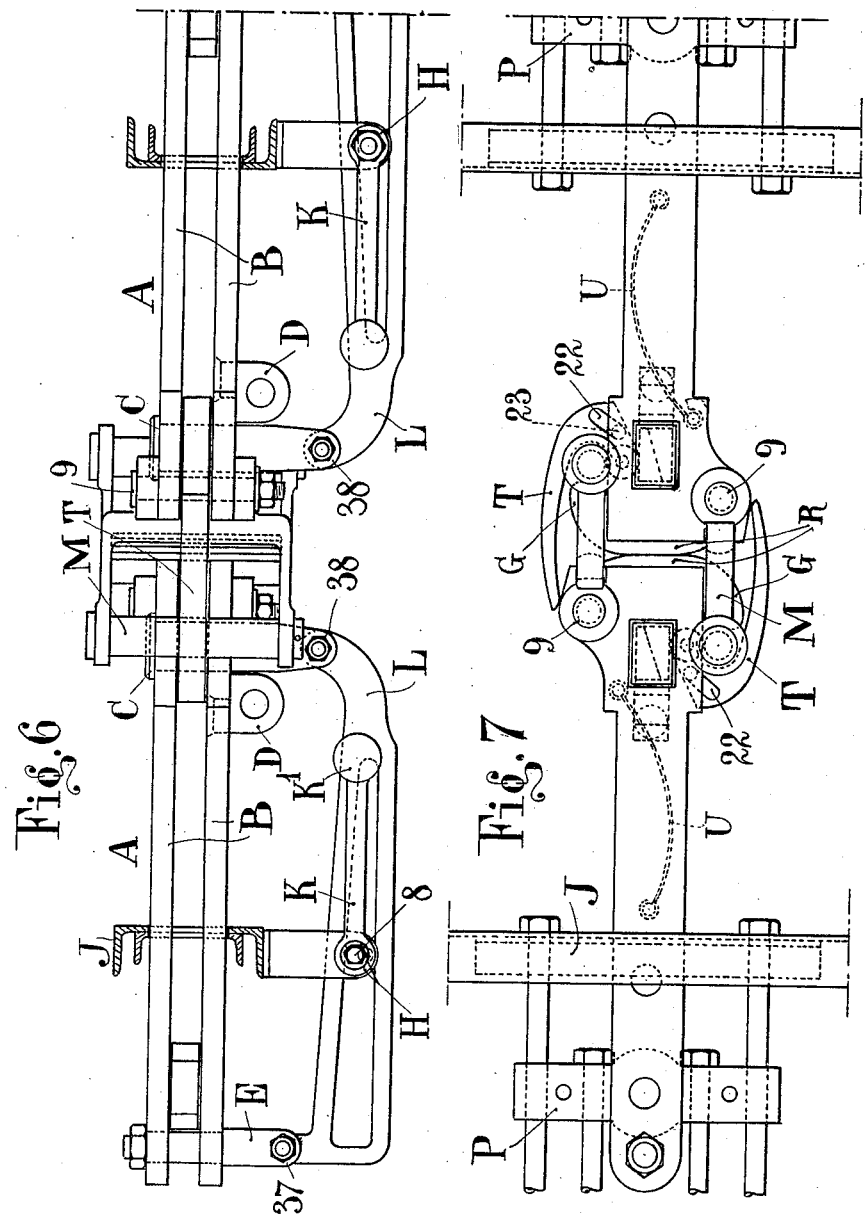

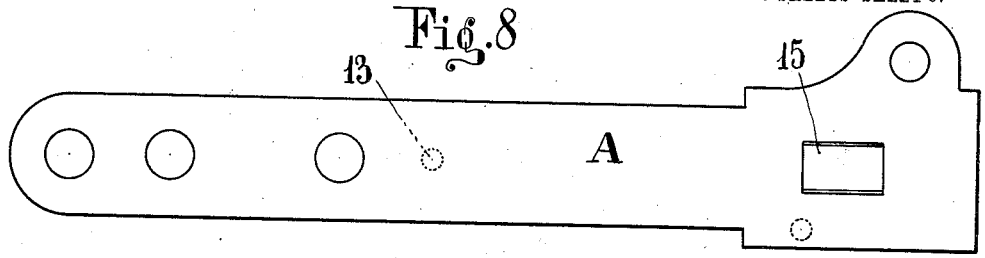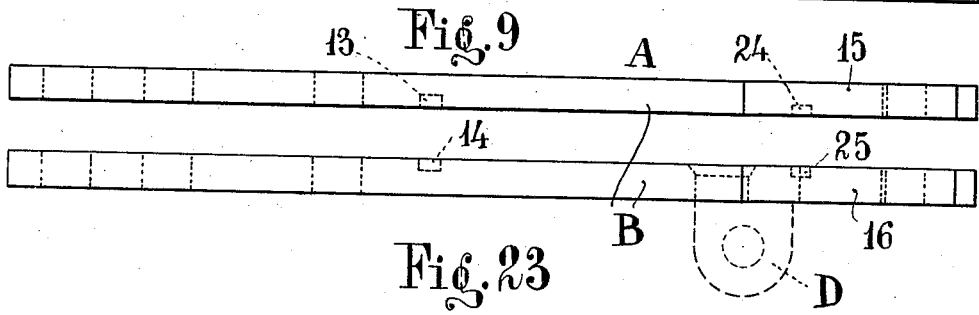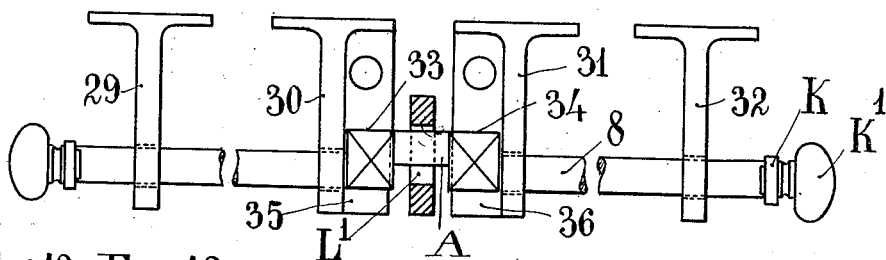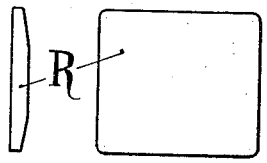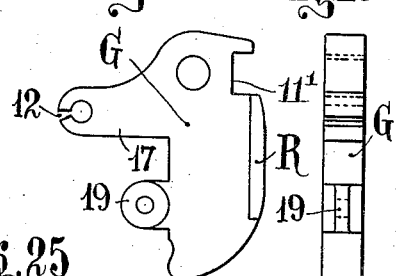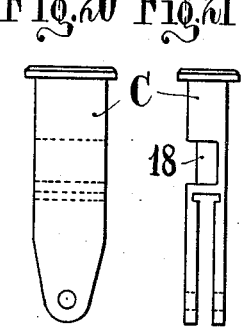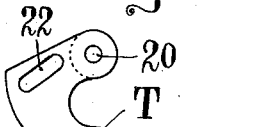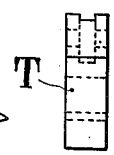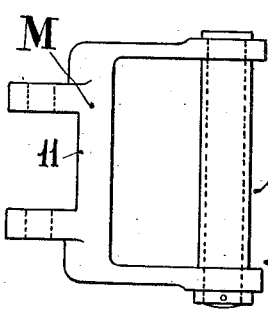

UNITED STATES PATENT OFFICE.

AGOSTINO TROMBETTI, OF CONDOVE, ITALY.

AUTOMATIC COUPLING FOR RAILWAY AND TRAMWAY CARS OR WAGONS.

1,056,958.  Specification of Letters Patent.  Patented Mar. 25, 1913.

Application filed June 29, 1911. Serial No. 636,005.

*To all whom it may concern:*

Be it known that I, AGOSTINO TROMBETTI, subject of the King of Italy, residing at Condove, Turin, Italy, have invented certain new and useful Improvements in or Relating to the Automatic Couplings for Railway and Tramway Cars or Wagons, of which the following is a specification.

My present invention relates to automatic car couplings and mechanisms appertaining thereto, and includes members adapted to engage each other for operatively connecting the cars to form a train, and to retain such members in locking engagement with each other when such is desired.

The principal objects of my invention are, to provide a device simple in construction, positive in action, and arranged to coact with a complementary coupler to act automatically for insuring the operative connection of cars to form a train.

A further object of my invention is to facilitate the mounting of the coupler in connection with the car whereby its position may be altered for the purpose of adapting it for connection to couplers of a different type, consistent with the disposition and construction of the two couplers, affording easy means of attaining a coupling connection.

In the drawings, forming a part of this specification: Figure 1 is a plan view of a car body or frame, parts being broken away and removed to condense the figures, such car frame being provided with car couplers embodying my invention. Fig. 2 is a central vertical longitudinal section through the draw bar of one of the couplers shown in Fig. 1. Fig. 3 is a cross sectional view on substantially the lines X—X of Fig. 1. Fig. 4 is a side elevation of two complementary couplers, approaching but not engaging each other. Fig. 5 is a plan view of the couplers as shown in Fig. 4. Fig. 6 is a view similar to Fig. 4 showing the couplers in locking engaged relation. Fig. 7 is a plan view of the couplers as shown in Fig. 6. Fig. 8 is a plan view of the draw-bar structure of the coupler. Fig. 9 is a side elevation of the same. Figs. 10 and 11 are a plan and side elevation, respectively, of a bar which is a detail of means yieldably mounting the coupler to the car frame. Figs. 12 and 13 are views in elevation and plan, respectively, of a lever, a detail of means for locking the couplers in engaged relation. Figs. 14 and 15 are views in elevation and plan, respectively, of a spring used in connection with the couplers. Figs. 16 and 17 are views in elevation and plan, respectively, of what is hereinafter termed a hook member, a detail of the coupler. Figs. 18 and 19 are views in front and side elevation respectively, of a buffer cap used in connection with the member shown in Figs. 16 and 17. Figs. 20 and 21 are views in front and side elevation, respectively, of a locking pin. Fig. 22 is a side elevation of what I hereinafter term a pin member, a detail of the coupler. Fig. 23 is a view in side elevation of means for actuating the locking mechanism, parts being shown in sections to disclose details of construction. Figs. 24 and 25 are views in side and end elevation, respectively, of what I hereinafter term a guide-arm, which is a detail of the coupler.

Similar characters refer to similar parts throughout the several views.

In the drawings, J designates a portion of the frame work of a car, to which draw-bars A of the couplers are operatively connected. The draw-bar A of each coupler may consist of two plates B, complementary formed and having apertures, as shown in Figs. 8 and 9 of the drawing, for the reception of pins, stays and the like.

I prefer to yieldably mount the coupler in connection with the frame-work J, and also to connect both couplers of the same car to move bodily in unison. With this end in view, I provide similar structures adjacent the ends of the car, one for each coupler, such structure including a bar P having an aperture $P^5$ and slidable upon guide rods 3 and 4 carried by the framework J; a plate 2 provided with an upstanding pin $P^1$ normally entering the aperture $P^5$ mounted subjacent to the rod P and carried thereby through bolts $P^3$, spring $P^4$ being interposed between the plate $P^2$ and the head of the bolts $P^3$, to retain the pin $P^1$ in a normal position; resilient members 5 and 6, such as springs, interposed between the bar P and the framework J; and rods 1 and 2 threaded into a cross bar F. As before stated, the draw bar A of the coupler has apertures therein, a plurality of which are adapted to be successively alined with the beforementioned aperture $P^5$ of the bar P and the plate $P^2$ may be depressed, as shown in Fig. 3 of the drawing, until the desired apertures are in alinement for positioning the coupler, whereupon the pin springs back into a normal position retaining the draw bar in connection with the bar P. The mounting structures of the two car couplers of each car are connected to permit actuation in unison, as before described, by a rod S having threaded engagement with the cross bars F, as clearly shown in Fig. 1 of the drawing. Adjustment for tensioning the members 5 and 6, and to position the couplers with respect to the car, may be attained by axially moving rods 1 and 2 by rotation, subject to their threaded engagement with cross bar F.

Referring now, more particularly to the automatic coupling mechanism of each coupler, G designates what I term a hook member which is pivoted, as at 9, to the draw bar A, and has a recess 12, projection 17, buffer heads R, and an aperture 19, the functions of which will be subsequently disclosed. A pin carrying member M is also adapted to swing about the pivot 9 and to move with or transmit movement to the hooked member G. This may be accomplished by seating a portion, 11, of member M in a complementary recess $11^1$ in member G whereby they are connected to move simultaneously about the one pivot 9.

The hook member G is normally positioned substantially as shown in Figs. 4 and 5 of the drawing, by a spring U, connected to the draw bar A by a pin 7, resting in recesses 13 and 14 of the bars B, and having its free end disposed in the before mentioned recess 12, the tendency of the spring being to normally position the members G and M in an uncoupling position. The plane of pin member M is substantially at a right angle to the plane or face of hook member G, and in an uncoupling position, the pin member M is disposed with its plane at an acute angle to the axis of the draw bar A. The draw bar A further carries a guide arm T which is pivoted to hook member G by apertured bifurcated portions 20 engaging the member G adjacent its aperture 19 and a pin 21 serves as a pivot means. The guide arm T has a cam slot 22, entering which is a pin 23, rigidly carried by the bars B and more particularly in recesses 24 and 25 thereof. The relative positioning of the pivot means 9 and 21, and cam slot 22 and pin 23, is such that movement of the hook member G out of a normal position does not materially affect the position of the arm T until the coacting hook member of the coupler to which the coupler in question is to connect with, has been positioned for hooked engagement by the member G, whereupon the member T assumes a position as shown in Figs. 6 and 7. It will be noted from Figs. 4 and 5, which show the two couplers approaching each other, that the guide arm T of each respective coupler actuate the hook members out of a normal position through the pin members M, to the coupling position shown in Figs. 6 to 7.

I provide means for retaining the members G in locked coupling relation by mechanisms more specifically shown in Figs. 5, 6, 20 and 23. The draw bar A carries, by clevis E, a lever L pivoted at the fixed point 37. The free end of lever L carries a pin C, passing through apertures 15 in plates B in proximity to member G, the pin being pivoted to the lever as at 38. The pin C is axially movable in a vertical plane with respect to the draw bar A and has a reduced portion 18 which may be alined in the horizontal plane of movement of hook member G, or moved out of such plane. When the reduced portion is in the horizontal plane of member G, this member may assume the normal position responsive to spring U, as shown in Fig. 5 of the drawing, the projection 17 entering said reduced portion and retaining the pin in a position where it may drop subject to disengagement of the projection 17 from reduced portion 18.

When the two couplers come into coupling relation, the members G of the coupler in question is automatically swung out of the normal position and consequently the pin C may fall in an axial direction whereupon the reduced portion 18 is no longer in the plane of movement of member G and therefore the said member is locked against movement to a normal position.

To facilitate the actuation of pin C for locking and unlocking purposes, I provide a crank rod 8 carried by brackets 29, 30, 31 and 32 extending from the frame J, the crank H of which works in a slot $L^1$ in lever L. Movement of rod 8 is facilitated by arms K, which may be provided with weights $K^1$, oscillation of the rod 8 transmitting an oscillatory movement to lever L and reciprocation to pin C.

I find it desirable to position the arm K as indicated in dotted lines, Fig. 4, when the pin is being held upwardly by members G, so that upon the said member releasing pin C, the latter will be positively lowered to a locking position with respect to the former, through the rod 8, due to movement of weight $K^1$, responsive to the force of gravity, the arm K assuming the position shown in Fig. 6 of the drawing, thereafter. When the arm K is in the position disclosed in Fig. 6, the crank 8 is so positioned by the flat portion of its arms 33 and 34 resting upon stops 35 and 36, respectively, that it, the crank, does not contact with either longitudinal margin of the slot $L^1$, as clearly shown in Fig. 23. Thus there is no frictional engagement between the lever L and crank when the pin C is in a locked position, and the cars, to which the coupler is attached, may vibrate or move responsive to changes in grade or uneven road beds, however, the lever can not, by such motion swing sufficiently to displace the pin C from a locking position.

By the construction shown, an effective coupling of the cars is obtained, which coupling does not take place automatically every time the coupling members of two cars come in contact with each other, but the coupling is effected only when one of them, or both, have been suitably arranged for the operation.

In order that the car, provided with the coupling member herein disclosed, may be coupled to a car provided with the ordinary coupling members, a block D is arranged under the plate B as shown in Fig. 2 of the drawing, and this block is provided with a looped link for the arrangement of the ordinary coupling members, the operation of which is not interfered with by the main coupler since the draw bar A may be drawn and retained toward the center of the car, as shown in Fig. 2.

When the coupler herein disclosed is used, it is possible to dispense with the ordinary buffers, because of the yieldable mounting of the draw bars A and of the whole system by means of the resilient members 5 and 6.

The operation of the device is as follows: In Figs. 4 and 5 the couplers are illustrated as positioned for approaching each other and for finally coupling with each other as shown in Figs. 6 and 7. If it is desired that the pin C not fall into a locking position the arm K is positioned as shown in full lines of Fig. 4, however, when it is desired to automatically lock the hook member G, then the arm K is positioned as indicated in dotted lines, whereupon it acts as hereinbefore described. The two buffer caps R contact and actuate members G while the guide arms T guide the pins of members M back of the hook members G of its complementary coupler, into coupling engagement and the member T assumes a position in close relation to the pin member of the opposite coupler responsive to the cam slot 22 and pin 23. If the pin C is not in an unlocking position the coupler may be disengaged upon movement of one of the cars, however, if the pin C has assumed a locking position, it may be raised by swinging the arm K so that the crank arm 8 raises lever L as hereinbefore described and illustrated.

I claim:

1. An automatic car coupler comprising in combination, a draw bar, a hook member pivotally carried thereby, a pin member movable with said hook member and projecting forwardly of said draw bar, a guide arm actionable upon movement of said hook member, means for guiding said guide arm in a predetermined path of movement, a locking pin having a reduced portion adapted to be positioned in the plane of movement of said hook member, permitting movement thereof to an uncoupling position, or to be moved out of the plane of movement of said hook member whereupon the locking pin retains said hook member in a coupling position, and means for actuating said locking pin.

2. An automatic car coupler comprising in combination, a draw bar, a hook member pivotally carried thereby, means for normally retaining said hook member in an uncoupling position, a pin member movable with said hook member, disposed at an angle of substantially 90° to the hook face thereof, and normally positioned forwardly of said draw bar at an acute angle to the axis thereof, a guide arm actionable upon movement of said hook member, means for guiding said guide arm in a predetermined path of movement, a locking pin having a reduced portion adapted to be positioned in the plane of movement of said hook member permitting movement thereof to an uncoupling position, or to be moved out of the plane of movement of said hook member whereupon the locking pin retains said hook member in a coupling position, and means for actuating said locking pin.

In testimony whereof I affix my signature in presence of two witnesses.

AGOSTINO TROMBETTI.

Witnesses:
 CARLO TORTA,
 JOCELYN GOUBEYRAN.